United States Patent
Namait et al.

(10) Patent No.: US 7,523,395 B1
(45) Date of Patent: Apr. 21, 2009

(54) WEB APPLICATION GENERATOR FOR SPREADSHEET CALCULATORS

(75) Inventors: Aman Namait, Redwood Shores, CA (US); Max Schireson, Los Altos, CA (US); Allison Waingold, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 244 days.

(21) Appl. No.: 10/452,699

(22) Filed: May 30, 2003

(51) Int. Cl.
*G06F 17/00* (2006.01)

(52) U.S. Cl. .................. 715/255; 715/243; 715/212

(58) Field of Classification Search ................ 715/517, 715/530, 513, 503, 522, 526, 500, 227, 219, 715/220, 212, 234, 255, 243, 248, 200
See application file for complete search history.

(56) References Cited

U.S. PATENT DOCUMENTS

| | | | |
|---|---|---|---|
| 6,088,708 A * | 7/2000 | Burch et al. ............. 715/509 |
| 6,163,878 A | 12/2000 | Kohl |
| 6,691,281 B1 * | 2/2004 | Sorge et al. ............. 715/503 |
| 6,697,693 B2 * | 2/2004 | Hagiwara et al. ......... 700/117 |
| 6,792,605 B1 | 9/2004 | Roberts et al. |
| 6,850,603 B1 * | 2/2005 | Eberle et al. ............ 379/88.16 |
| 6,920,608 B1 * | 7/2005 | Davis .................... 715/503 |
| 6,968,539 B1 | 11/2005 | Huang et al. |
| 7,010,779 B2 * | 3/2006 | Rubin et al. ............. 717/106 |
| 2004/0098284 A1 * | 5/2004 | Petito et al. .............. 705/1 |
| 2004/0117804 A1 * | 6/2004 | Scahill et al. ............ 719/320 |
| 2004/0216044 A1 * | 10/2004 | Martin et al. ........... 715/526 |
| 2005/0050088 A1 * | 3/2005 | Kotler et al. ............. 707/102 |
| 2005/0060646 A1 * | 3/2005 | Gauthier et al. .......... 715/513 |

OTHER PUBLICATIONS

Microsoft Excel 2000 printout (hereinafter Microsoft-Excel-2000), copyright 1999, pp. 1-6.*

* cited by examiner

*Primary Examiner*—Thu Huynh
(74) *Attorney, Agent, or Firm*—Young Law Firm, P.C.

(57) ABSTRACT

A method and system automatically creates and operates a web application from a spreadsheet without the need for specialized programming. The web application includes a guided data entry process created from spreadsheet worksheets. The web application interfaces with a database application, so that model data may be retrieved for analysis. The web application implements the model as a calculator data defining the relationships between the model values. A rendering data defines the appearance of the model values in the web application. A instance data includes the model values for an instance of the web application. A calculation engine calculates model values. A layout engine creates display information from the calculator, rendering, and instance data set. The rendering data includes objects having display methods for creating display information in accordance with its object type. Object types include inputs, outputs, and user interface elements.

19 Claims, 6 Drawing Sheets

WEB APPLICATION GENERATOR FOR SPREADSHEET CALCULATORS

BACKGROUND OF THE INVENTION

The present invention relates to the field of software applications generally, and specifically to the implementation of financial applications. Financial models are widely used in businesses to evaluate business transactions, project feasibility, management decisions, and potential sales or purchases. A spreadsheet software application is often used to create financial models. A spreadsheet software application is an accounting or bookkeeping program that displays data in rows and columns of cells on a screen. Users can manipulate numerical and string data values stored in each cell. The value in a cell can also be calculated from a formula assigned to the cell. A cell's formula may depend on other cells' values and will be recalculated automatically whenever a value on which it depends changes.

The set of cells forming the financial model is referred to as a workbook. To simplify the appearance and use of a financial model, a workbook may be organized into one or more worksheets having a set of related cells. Each worksheet presents users with a view of related cells from the financial model. Users can view different worksheets in a workbook separately or simultaneously. Additionally, cells may be displayed with different formatting attributes, including fonts, headings, colors, screen positions, and numerical formats. Charts, graphs, and other visual aids can also be created from one or more cell values and included with the workbook.

Spreadsheet applications are relatively simple to learn and are widely used by businesspeople for a variety of applications. For example, a project manager can use a spreadsheet application to create a return on investment (ROI) model showing the benefits of a company's product. The company's sales force can use the ROI model to create a personalized assessment of the benefits of the product for their potential customers.

One problem with this approach is that the model designer, for example the project manager, must distribute the workbook with the financial model to the model users, for example the sales force. This distribution is time-consuming and error-prone, often leaving some model users with out of date financial models. Additionally, each model user must have a copy of the spreadsheet application to access the financial model. With a large number of model users, the costs for spreadsheet applications can be enormous.

Furthermore, a complicated financial model may be difficult to use for model users, especially when model users do not understand the intricacies of the financial model. A model user may forget to enter some necessary data, resulting in incomplete or incorrect analysis. Moreover, although the financial model may create some visual aids, such as charts or graphs, associated with its analysis, a spreadsheet application does not produce high-quality, professional presentation materials personalized for each model user's data.

Additionally, the data entered by model users cannot be easily collected and aggregated. This deprives managers of the benefits of analyzing the data collected by model users. For example, if the data entered by the sales force into a financial model could be easily analyzed, managers could monitor the performance of the sales force and could easily identify emerging needs of customers and weaknesses in their product line. The model designers could also evaluate the effectiveness of the financial model and determine where changes or improvements could be made. Spreadsheet applications cannot easily collect and aggregate data from model users, making it difficult for managers and model designers to analyze model data.

A prior approach to these problems is to convert the financial model created in a spreadsheet application into a web-based application. A web-based application allows model users to access the financial model through a web site. Because all model users access the financial model through the web site, when the web site is updated with a new financial model, the new financial model is automatically distributed to model users. Additionally, model users can operate the financial model through an inexpensive web browser application, rather than a spreadsheet application, significantly decreasing the costs associated with a large number of model users.

Further, a web-based application can guide model users through the data entry process. This ensures that model users enter all necessary data into the financial model and prevents erroneous results from incomplete or incorrect data. For example, a web-based application can guide a model user through the data entry process using a wizard, which is sequence of screens or dialog boxes that prompt the model user to enter the required data for the model. A model user can move forward or backward through the sequence of dialog boxes to add or modify data for the model. The wizard can also verify that the data values entered by a model user are correct.

Following entry of the model data, the web-based application can generate a high-quality presentation or report from the results of the financial model. A report provides a personalized summary of the results of the financial model for a specific set of model input values. A report may also include additional marketing content selected according to the value of the model data or the output of the financial model. For example, a sales force can use a ROI web application to create a personalized assessment of the benefits of the product for their potential customers.

Additionally, the web-based application can be integrated with a database. As model users enter model data into the web-based application, the database stores the model data. The database can store model data collected from each model user. Managers and model designers can analyze the model data stored in the database.

The web-based implementation of a financial model offers many advantages over its spreadsheet application counterpart; however, web-based applications are often difficult and time-consuming to develop. Web-based applications often require programming in a complicated programming languages such as Java™. Although most business people can develop financial models in a spreadsheet application with little or no specialized training, implementing a financial model as a web-based application often requires the assistance of one or more computer programmers. This results in increased time and resources needed to develop a web-based financial model over a spreadsheet application implementation. The development of web-based financial models is further complicated by the fact that often programmers do not understand the intricacies of the financial model, leading to mistakes in the web-based implementation that need to be corrected. Furthermore, because the financial model is "hard-wired" in the web-based application, it is difficult for model designers to make updates or improvements to the model.

It is desirable to develop a system for quickly and efficiently creating web applications implementing models without the need for specialized programming expertise and using software applications familiar to business people. Further, the resulting model should be able to be rapidly and inexpensively distributed to model users, to provide guided data entry to users, to produce high-quality presentations or reports from the results of the financial model, and to store model data values for analysis by managers and model designers.

BRIEF SUMMARY OF THE INVENTION

The invention, generally, is a method and apparatus that automatically creates and operates a web application from a spreadsheet model without the need for specialized programming language expertise. In an embodiment, the web application includes a guided data entry process created from the worksheet pages in a spreadsheet model. An additional embodiment of the invention is interfaced with a database application, so that model data may be retrieved for analysis.

In an embodiment, a system implements a model as a web application including a computational data set defining the relationships between the model values. A rendering data set defines the appearance of at least a portion of the model values in the web application. A instance data set includes the model values of an instance of the web application. A calculation engine is adapted to create model values in the instance data set from the set of the model values, and a layout engine is adapted to create display information from the computational data set, the rendering data set, and the instance data set. In another embodiment, the system includes a persistence engine adapted to store, retrieve, and/or modify the computational data set, the rendering data set, and the instance data set.

In an embodiment, each of the rendering data sets is associated with one of the model values. Each of the rendering data set has an object type corresponding to a model value type of its associated model value. Object types include model input values, user interface elements, and model output values. Each object further includes a display method adapted to create display information for the associated model value in accordance with the object type of the object. In a further embodiment, the display method creates HTML source code to display the associated model value within a web page.

In another embodiment, the system also includes a web application generator adapted to create the computational data set, rendering data set, and instance data set from a model. In an embodiment, the model includes a spreadsheet model. In yet another embodiment, the model also includes a document template. In a further embodiment, the spreadsheet model is organized into a number of worksheets. In this embodiment, the layout manager creates display information from the rendering data sets associated with one of the worksheets.

In a further embodiment, the spreadsheet model includes spreadsheet cells. Spreadsheet cells can each be associated with one of the model values. Spreadsheet cells can also have a layout tag defining the appearance of the cell's model value in the web application. In yet a further embodiment, each layout tag is associated with an object type. Additionally, the web application generator creates an object of the object type in response to the layout tag.

BRIEF DESCRIPTION OF THE DRAWINGS

The present invention will be described with reference to the drawings, in which.

DETAILED DESCRIPTION OF THE INVENTION

Figure 1:
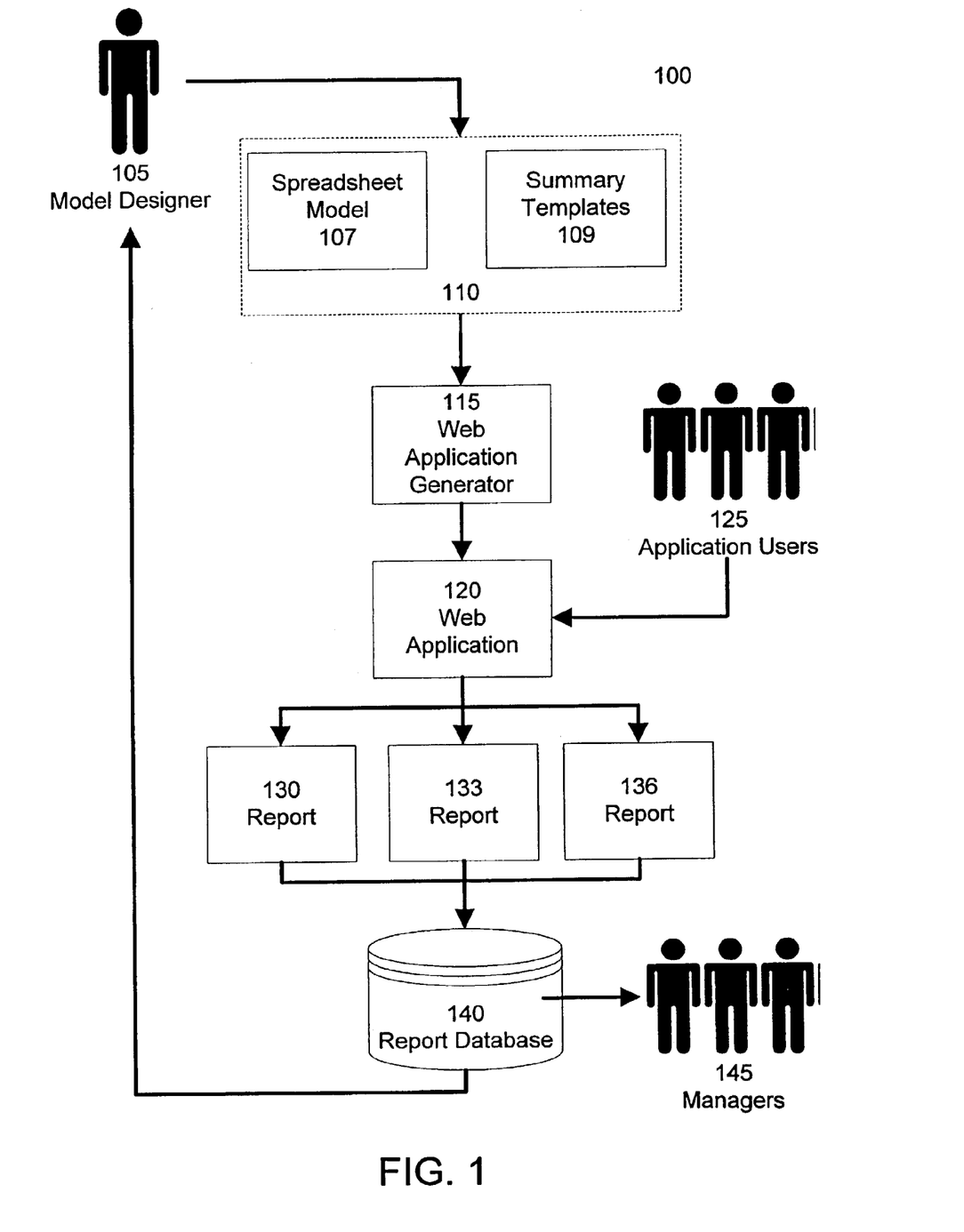
FIG. 1 is a block diagram illustrating the use of an embodiment of the present invention.

The present invention automatically converts a financial model in a spreadsheet application into a web-based application. FIG. 1 is a block diagram 100 illustrating the use of an embodiment of the present invention. A model designer creates a model 110. The model 110 can implement any type of mathematical or financial evaluation and can output text, graphics, or numeric data. The model 110 includes a spreadsheet model 107. In an embodiment, the spreadsheet model 107 is created by the model designer 110 in a spreadsheet application. The spreadsheet model 107 includes input cells intended to receive input data from model users; output cells adapted to display the results of the model 100; and formulas and/or macros necessary to determine the results of the model from input data. In an embodiment, the spreadsheet model 107 also includes formatting attributes for the model, such as fonts, headings, colors, screen positions, and numerical formats.

In a further embodiment, the model 100 optionally includes one or more summary templates 109. Summary templates 109 are used to format the model results in a presentation or report personalized for a set of model input values. Summary templates 109 can be used to create presentations or reports in a variety of formats and mediums. For example, a first summary template can produce a presentation or report as a web page, while a second summary template can produce a presentation or report as a electronic or printed document. Alternately, summary templates 109 can be omitted from model 110 and a presentation or report can be created from the spreadsheet model and the formatting attributes included therein.

The model designer transfers the model 110 to the web application generator 115. In an embodiment, the model 110 is uploaded from a model designer's computer to the web application generator 115 located on a remote computer. In a further embodiment, the model is uploaded to the web application generator 115 through a web page. Alternately, an embodiment of the invention allows a model user to transfer the model 110 to the web application generator 115 directly from a spreadsheet application.

Web application generator 115 processes the model 110, including the spreadsheet model 107 and optional summary templates 109, to create a web application 120. Web application 120 implements the model 110 in a web-based format. Application users 125 can access the web application 120 with a web browser. The web application 120 displays the model as one or more web pages. Application users 125 enter input data into the web application 120 via one or more web pages. In a further embodiment, a series of web pages present a guided data entry sequence to the application user. The results of the model are displayed by the web application 120.

The application users 125 use the web application 120 to generate a number of reports 130, 133, and 136. Each report summarizes the results of the financial model for a given set of input data values. A report may include numerical information, text information, and visual aids such as charts or graphs. A report may also include additional marketing content selected according to the values of the model data or the output of the financial model. A report may be displayed as a web page or as an electronic or printed document. The format of the report may be determined from formatting attributes included in the original spreadsheet model 107, or optionally by one or more summary templates 109 included with the model 110. In a further embodiment, the application user can select from a number of different formats for the report associated with a given set of input data values.

An application user can use the web application to create any number of reports. In an embodiment, all of the reports 130, 133, and 136 are stored by the web application 120 in report database 140. Application users 125 can retrieve previously created reports from report database 140 through the web application 120 at any time. In an embodiment, report database 140 stores the set input data values associated with each report. In this embodiment, the web application 120 retrieves a stored report by retrieving the set of previously stored input data values from report database 140 and recreating the report from the set of input data values. Additionally, application users 125 can update previously created reports by changing one or more input data values. Managers 145 and the model designer 140 also have access to reports stored in report database 140. In an embodiment, web application 120 stores additional information identifying the application user responsible for each report in the report database 140. This allows managers to analyze the performance of both the model 110 and individual application users.

As demonstrated by this example, the present invention provides a system for quickly and efficiently creating models without the need for specialized programming expertise. Business people can develop sophisticated, highly integrated web applications using a common spreadsheet application to specify the inputs and outputs of the model. The resulting financial model is rapidly and inexpensively distributed to model users, provides guided data entry to users, produces high-quality presentations or reports from the results of the financial model, and stores model data values for analysis by managers and model designers.

Figure 2:
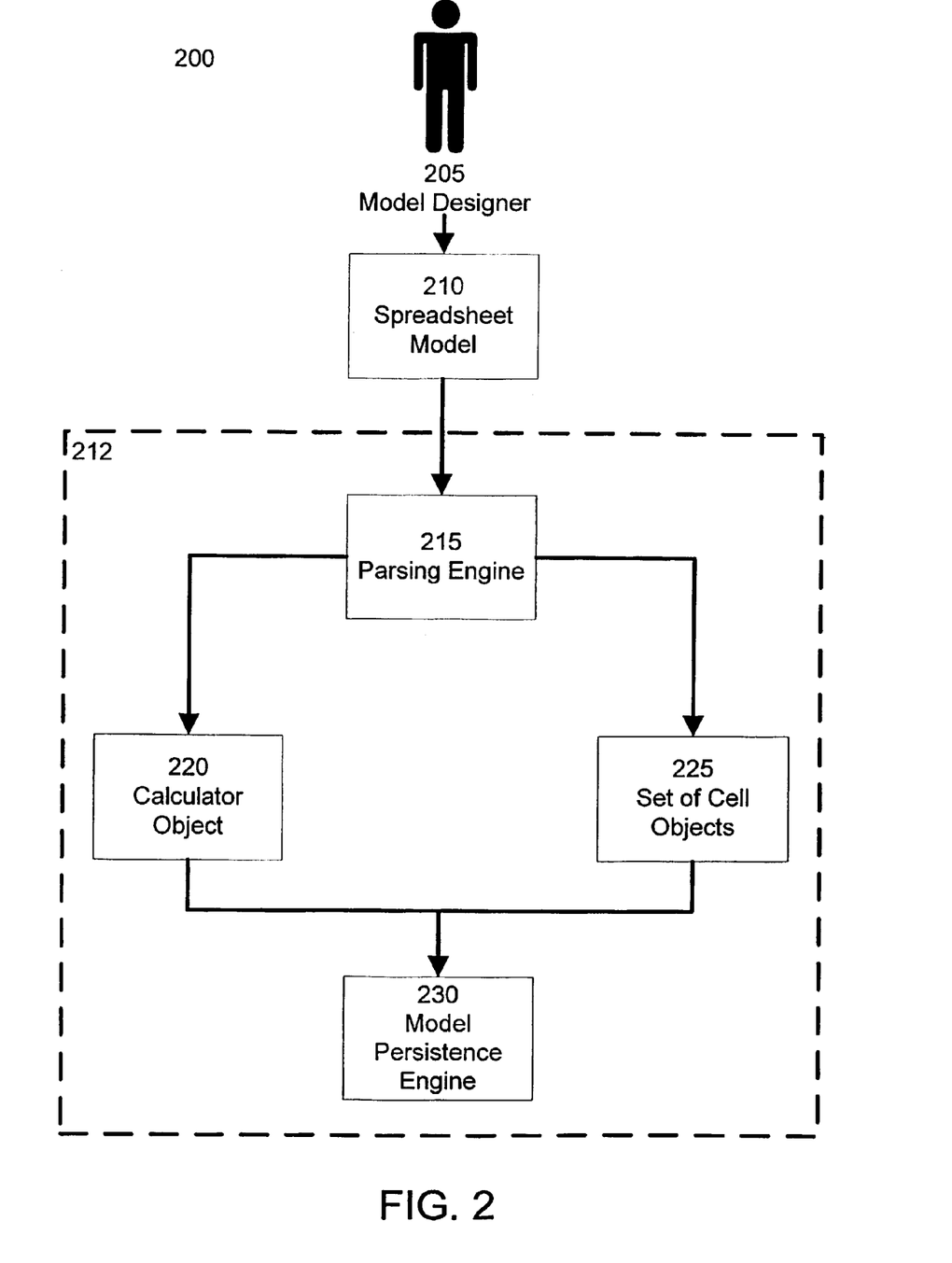
FIG. 2 illustrates a system for creating a model according to an embodiment of the invention.

FIG. 2 illustrates a system 200 for creating a model according to an embodiment of the invention. A model designer 205 uses a spreadsheet application to create a spreadsheet model 210. The spreadsheet model 210 defines the inputs and outputs of the model. The model designer 205 defines the relationship between model inputs and model outputs using spreadsheet formulas or functions. The spreadsheet model 210 can include any formula, function, or macro supported by the spreadsheet application to define the model outputs. In an embodiment, the model designer uses a set of specially-created macros to designate cells in the spreadsheet model 210 as user interface elements. User interface elements include model inputs and model outputs. These macros act as proxy functions within the spreadsheet application, passing through the underlying cell value, including any formula associated with the cell, to the spreadsheet application. However, as discussed below, the web application generator recognizes these macros as designating web application inputs or outputs and displays these cells accordingly. A model designer 205 can "tag" any number of cells in the spreadsheet application as user interface elements, including any number of model inputs or model outputs.

For example, a model designer 205 can tag a spreadsheet cell as an input using the "oInput" macro. A cell containing the spreadsheet formula "oInput("20")" would be treated by the spreadsheet application as a cell with a value of 20. The web application recognizes this macro as designating an input cell with a default value of 20. In this example, the web application will render a web page with an input box, such as an HTML input box, with a default value of 20. As discussed in more detail below, after the application user enters a value into the input box, the web application transfers the input value from the input box into its internal representation of the input cell of the spreadsheet model. In this manner, data values are input into the web application.

In another example, the "oOutput" macro designates a cell containing an output value. A cell containing the spreadsheet formula "oOutput(10*B1)" would be treated by the spreadsheet application as a cell with a value 10 times the value of cell B1. The web application recognizes the "oOutput" macro as designating an output cell. In this example, the web application will display the value of 10 times the value of cell B1.

In addition to defining the model inputs and outputs, the spreadsheet model 210 also includes formatting and layout information defining the appearance and operation of the resulting web application. An embodiment of the spreadsheet model 210 is spreadsheet workbook. The spreadsheet workbook typically includes several worksheets. In an embodiment, the layout, or position of cells, on a worksheet determines the position of corresponding elements in the web application. In a further embodiment, formatting attributes, such as fonts, borders, shading, and numerical formats, are also carried over from the spreadsheet model 210 to the web application.

In an additional further embodiment, the worksheets are used to create a guided data entry process in the resulting web application. The web application displays each worksheet in a workbook as one screen of a wizard guiding data entry for the model. As discussed above, a wizard is a sequence of screens or dialog boxes prompting the application user to enter the required data. The model designer, by organizing input cells over several worksheet pages, defines the layout and structure of a wizard in the web application. The web application automatically adds controls for navigating forward and optionally backwards between the screens of the wizard defined by the worksheets in the workbook. The web application may also automatically display status or progress information on each screen of the wizard. If the model designer 205 needs to use one or more worksheets for hidden calculations, these worksheets can be hidden in the spreadsheet model 210 and will not be part of the wizard displayed by the web application.

In addition to macros defining model inputs and outputs, an embodiment of the invention includes additional macros for defining user interface elements in the web application. The set of macros defining user interface elements, including the macros for input and output cells described above, are referred to the rendering definition language. Table 1 lists an example set of macros in a rendering definition language used by an embodiment of the invention for defining user interface elements. As discussed in detail below, an embodiment of the invention uses an object-oriented approach for implementing user interface elements. This allows additional types of user interface elements to be added as needed.

TABLE 1

Web Application Macros

| | |
|---|---|
| oAssumption | Argument contains a fixed or calculated value that is visible to the user as an input box only when the user clicks "Details & Assumptions". Use this rather than oInput to minimize screen clutter for items that are not normally changed. See oInput. |
| oChart | Make the identified chart available for the author or template use, including colors, labels and legend. |
| oCheckbox | Creates a single checkbox whose value is TRUE if |

TABLE 1-continued

Web Application Macros

| | |
|---|---|
| | checked. You can use any number of checkboxes on a page. |
| oDetail | Allows the model designer to specify an output that is not normally shown (to reduce clutter). The output is shown only when the "Details & Assumptions" button is clicked. (See oOutput) |
| oDropdown | Allows the model designer to specify an input list of valid values of which the user can select only one. The web application will display the list as a dropdown box. |
| oHeader | Allows the model designer to specify a bold, and/or colored "header" to the user. See oNote. |
| oHide | Hides a particular input or output based on previous input or calculation. |
| oHideSheet | When set true, the web application omits the worksheet from the wizard. This macro can be in any cell on the worksheet to be omitted. |
| oHTML | Embeds raw html into the web page displayed to the user. The HTML is inserted in a table data element without any translation. |
| oInput | Allows the model designer to request an input (text or numeric). The input can have a literal or calculated default (see oInputArea and oAssumption). |
| oInputArea | Allows the model designer to specify a textual input in a multi-line input box. |
| oNote | Allows the model designer to specify some information back to the user. They are always present (e.g. regardless of the "Details & Assumptions" button). |
| oOutput | Allows the model designer to specify an output. The spreadsheet application formatting will be used for the output (e.g. "%", "$", etc.). In an embodiment, if the value is uncalculated, then nothing is displayed to the user. |
| oRadio | Allows the model designer to specify an input with multiple options where the user can "only" choose one. The web application displays a "radio box" user interface element allowing user selection of one option. |
| oRankedTable | Identifies a table of content that can be included in a document in a dynamic order. |
| oSetAutoLayout | If not included on a worksheet, AutoLayout is enabled (e.g. page is set into a standard 2-column format with labels on left, inputs/outputs on right). |
| oTable | Generates a formatted table. Example: oTable(B17:E24) creates a table with text and calculated values that are on the same worksheet between cells B17 and E24. |
| oTip | Allows the model designer to specify a hint to the user for an input. |
| oURL | Allows the model designer to link to an external web page |
| oWorksheet | Allows the model designer to link another sheet within the model. |

In addition to creating a spreadsheet model, the model designer may optionally create one or more templates defining a report for displaying the final results of the model. In an embodiment, a template is an HTML file. The template may be created using an HTML editor, including graphical or WYSIWYG style applications. In another embodiment, the template is a RTF (Rich Text Format) file. An RTF template may be created with a word-processing application. The template file includes tokens that are matched with cells from the web application, such as cells having associated with model inputs or model outputs. Any cell can be associated with a token. The value of each cell is inserted into the template in place of the corresponding token. In an embodiment, a text label located in a cell to the immediate left of a cell defines the name of a corresponding token. For example, if a cell to the left of an output cell is labeled "Profit", then the token for this output cell in the template file is named "<@Profit@>".

After the model designer 205 has completed the spreadsheet model 210 and any optional templates, the spreadsheet model is transferred to the web application generator 212, as described in FIG. 1. The web application generator 212 includes a parsing engine 215 for processing the spreadsheet model. The parsing engine 215 reads the spreadsheet model 210 and extracts the cells containing rendering definition language macros. An embodiment of the parsing engine 215 can be adapted to read a variety of different types of spreadsheet formats. The parsing engine 215 then creates two types of data objects from the spreadsheet model. The computational data set is a calculator object 220. The calculator object 220 encapsulates the logic and calculations of the spreadsheet model without the rendering definition language macros. The calculator object implements the functions of the spreadsheet model 210.

The second type of data object created by the parsing engine is a set of cell objects 225. The set of cell objects 225 encapsulate the format and layout of the spreadsheet model 210. Each macro in the rendering definition language has a corresponding type of cell object. Each type of cell object includes one or more methods for displaying an instance of itself in the web application. Each type of cell object may further include one or more methods for inputting, outputting, and/or calculating a value of an instance of itself. Each cell object may also have numerous data attributes, including a position and formatting attributes.

For example, the "oInput" macro, defining an input cell in the spreadsheet model, has a corresponding oInput object type. The oInput object has a method for displaying itself in the web application. When the oInput object's display method is invoked, the oInput object creates the HTML source code necessary to display an HTML text input box. After the user enters an input value, the oInput object also has a method for storing the input value in the object. Similarly, an "oDropdown" macro has a corresponding oDropdown object type. Invoking the display method of a oDropdown object creates the HTML source code necessary to display an HTML dropdown menu.

The set of cell objects 225 corresponds to the set of cells in the spreadsheet model with rendering definition language macros. The parsing engine 215 locates all of the cells with rendering definition language macros in the spreadsheet model 210. For each cell with a rendering definition language macro, the parsing engine creates an instance of the corresponding type of cell object. The data attributes of each instance of a cell object are initialized with the values associated with the original cell. For example, if a cell in the spreadsheet model has the value "oInput("20")", which defines an input cell with a default value of 20, the corresponding oInput cell object, will have its default value data attribute set to 20.

Both the calculator object 220 and the set of cell objects 225 are then stored by the model persistence engine 230. The model persistence engine 230 allows the web application to store and retrieve data objects, such as the calculator object 220 and the set of cell objects 225, and also other data objects discussed below. In an embodiment, the model persistence engine 230 stores data objects in a database. In this embodiment, the model persistence engine 230 is used to retrieve and update data objects in the database as well.

Figure 3:
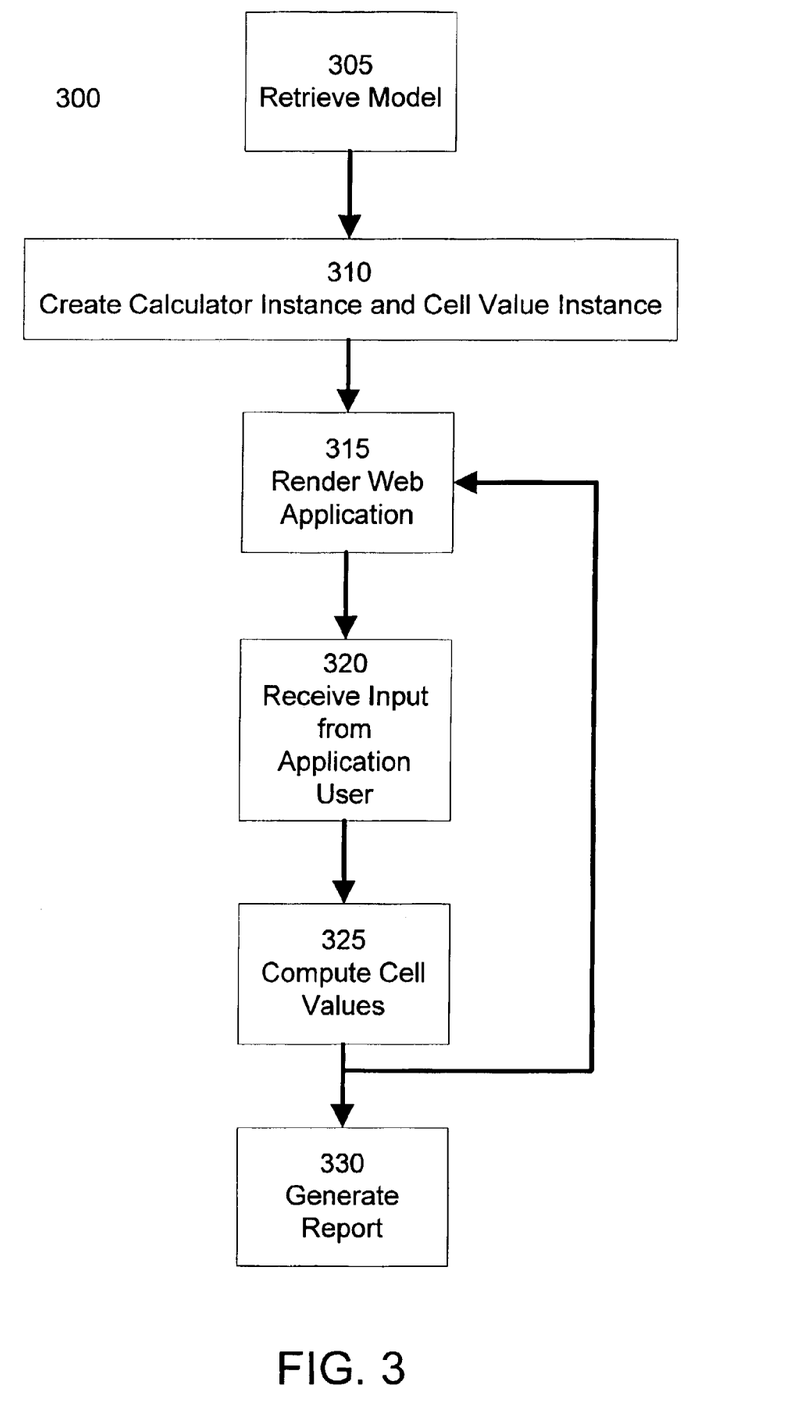
FIG. 3 illustrates a method of operation for a web application implementing a model according to an embodiment of the invention.

FIG. 3 illustrates a method 300 of operation for a web application implementing a model according to an embodiment of the invention. A model user logs into a web server system hosting the web application. Once the model user has logged into the web server system, the model user initiates a session with the web application. In an embodiment, the model user is then prompted for information identifying a particular instance of the web application. For example, if the web application is used to prepare a report for a customer, then identifying information may include the customer name and contact information. This identifying information can be included in the report.

At step 305, the web application retrieves the model. In an embodiment, a model persistence engine is used to retrieve the calculator object and the associated set of cell objects. At step 310, the web application creates a calculator instance from the calculator object. The calculator instance is a replica of the calculator object used to compute the model for a given set of input and output data values. A calculator instance is created for each new report created by the web application. Step 310 also creates cell value instances from the set of cell objects. The cell value instances are a replica of the set of cell objects. The cell value instances hold the data values associated with the cells of the model for a particular report, including input data values, output data values, and intermediate data values, which are used in calculating output data values.

At step 315, the web application renders the web application in the model user's web browser. All or only a portion of the financial model may be accessible at one time to the model user. For example, if the web application is using a guided data entry process, step 315 will render only one screen of a wizard at a time in the model user's web browser.

In an embodiment, step 315 creates a HTML format web page and returns this web page to a model user's web browser for display. In a further embodiment, step 315 dynamically creates a HTML format web page from a worksheet in a workbook. A method for dynamically creating a HTML format web page from a worksheet according to one embodiment of the invention is discussed in detail in FIG. 5 below.

Following step 315, the model user can enter data into the web application through the web browser. In an embodiment, the web page displayed by the model user's web browser includes HTML user interface elements, such as text boxes, dropdown boxes, check boxes, and radio boxes. The user interface elements displayed on the web page are determined by the model designer using the rendering definition language macros described above.

In this embodiment, the web page further includes HTML user interface elements and associated source code for collecting input data from the model user. In one embodiment, a model user selects a button or other user interface element to indicate that data entry on a page is complete. In a further embodiment, the model user selects a link, button, or user interface element to navigate to another web page of the web application. This selection also indicates that data entry on the web page is complete. In response to user input, the model user's web browser returns all of the input data entered by the user to the web application. In an embodiment, an HTTP GET or POST operation is used to submit input data to the web application.

At step 320, the web application receives input data from the model user's web browser. The web application matches the received input data with the corresponding cell value instances, storing the input data values in the appropriate cells values of the calculator instance. In an embodiment, the web application communicates with a web server that receives input data from a model user's web browser via an HTTP operation, such as a GET or POST operation.

In an embodiment, the web application stores the input data in a database. The model persistence engine, discussed above, stores input data. In a further embodiment, to improve the performance of the web application, the model persistence engine compares each model input value received in step 320 with its previous value, which was retrieved and displayed in step 315. If a model value is unchanged, then the model persistence engine does not need to update the model value stored in the database.

At step 325, the web application computes cell values from input data. As discussed above, the calculator instance is a replica of the calculator object and contains the formulas or other logic used to compute the values of output cells from input cells. In an embodiment, the web application computes the cell values using the input data values stored in the cell value instances and the calculator instance. Newly calculated cell values are associated with the corresponding cell value instances. A cell can have a formula that depends on the values in one or more other cells. In a further embodiment, step 325 is optimized to compute cell values for cells with formulas only if the value of one or more "parent" cells is changed by the input data received in step 320.

In an embodiment, step 315 automatically creates a wizard from multiple worksheet pages in a workbook. In this embodiment, step 315 sequentially creates separate web pages for each worksheet in a workbook. As the model user completes data entry for each web page, steps 315, 320, and 325 are repeated for each worksheet in a workbook, so that the web application receives all of the necessary input data from the model user.

Following completion of the steps 315, 320, and 325 for one or more worksheet pages, the web application generates a report at step 330. In an embodiment, the web application substitutes the values of cells for corresponding tokens in a template file. A token is a text label associated with a cell. In one embodiment, a cell's token value is assigned by the parsing engine during the creation of the web application from a label in an adjacent cell of the spreadsheet model.

An embodiment of step 330 creates a report from a HTML template. The HTML template is combined with the cell values input by the user and/or computed by the web application to create a report in the form of a web page. The web page is communicated to the model user's web browser for display to the user. Alternatively, an embodiment of step 330 creates a report from an RTF template. The RTF template is combined with the cell values to create a report in the form of a RTF file. The RTF file is communicated to the model user's web browser for display. In a further embodiment, the report, either from an HTML, RTF, or other template, is sent to the model user via e-mail or printed out.

Figure 4:
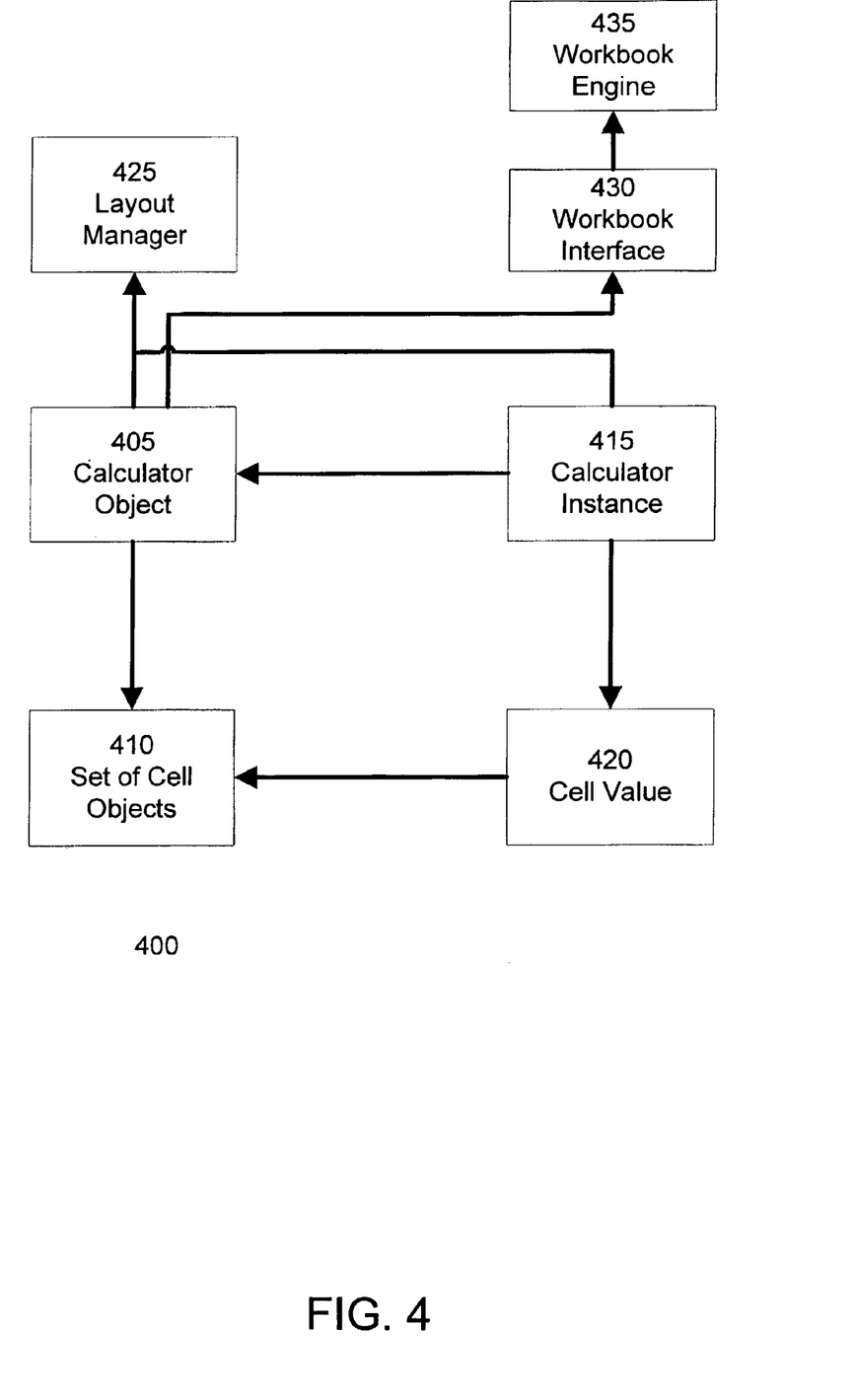
FIG. 4 illustrates the interactions of a set of data structures with the web application according to an embodiment of the invention.

FIG. 4 illustrates the interactions of a set of data structures with the web application according to an embodiment of the invention. As discussed above, the web application 400 includes a calculator object 405 and a set of cell objects 410. These objects are created by the parsing engine from the spreadsheet model during the creation of the web application 400. The calculator object 405 describes the computation of the model designer's original spreadsheet model. The set of cell objects 410 describe the format and layout of the user interface elements, such as input and output cells, displayed by the web application. The set of cell objects are defined by the rendering definition language macros included in the spreadsheet model. In an embodiment, there is a cell object corresponding to each "tagged" cell in the spreadsheet model.

The calculator object 405 and the set of cell objects 410 remain unchanged for every session and instance of the web application 400. In contrast, calculator instance 415 and cell value instances 420 are created for each new report or model instance created by the web application. Calculator instance 415 represents the current state of the model in the web application. As many model users can access the web application simultaneously, each separate instance of the web application 400 needs its own calculator instance 415. Each new calculator instance 415 is created and initialized from the calculator object 405. In an embodiment, the calculator instance 415 is further initialized with identifying attributes such the model user's name and/or a customer name. The calculator instance 415 also encapsulates the cell value instances 420. The cell value instances represent the values of cells in that instance of the model. For each cell in the calculator object 405, a corresponding cell value instance is created for each new report created by the web application 400.

The layout manager 425 renders the web application. The layout manager 425 processes the cells in the calculator object 405. In an embodiment, the layout manager determines the display location of each cell in the calculator object 425. For each cell in the calculator object 405, the layout manager retrieves the cell value from the cell value instances 420 and the corresponding cell object from the set of cell objects 410. The layout manager 425 then invokes the cell object with the cell value to produce the display information determining the appearance of the cell.

In an embodiment, each cell object has a method creating HTML source code for displaying the cell. This method is invoked with the cell value to create the HTML source code for the cell displaying the cell value. In this embodiment, the layout manager 425 processes cells in the order they are to be displayed on the desired web page, so that the HTML source code of each cell is automatically located in the proper position on the page. The layout manager 425 may further insert additional HTML source code for page navigation (e.g. between screens of a wizard), status information, headers and/or footers, and initialization and/or closing the web page.

The workbook interface 430 and workbook engine 435 work together to compute the values of cells from model data. The workbook interface 430 includes methods to read a calculator model 405, and to set and retrieve formulas and values from cells. In a further embodiment, the calculator model 405 encapsulates the original spreadsheet model in its native file format. In this embodiment, the workbook interface 430 includes methods adapted to operate on a spreadsheet model in its native file format. The workbook engine 435 is used to compute the values of cells based upon the inputs and formulas provided by the workbook interface 430. The advantage of this arrangement is the workbook engine 435 can be easily replaced depending upon the type of spreadsheet file format or operating environment.

Figure 5:
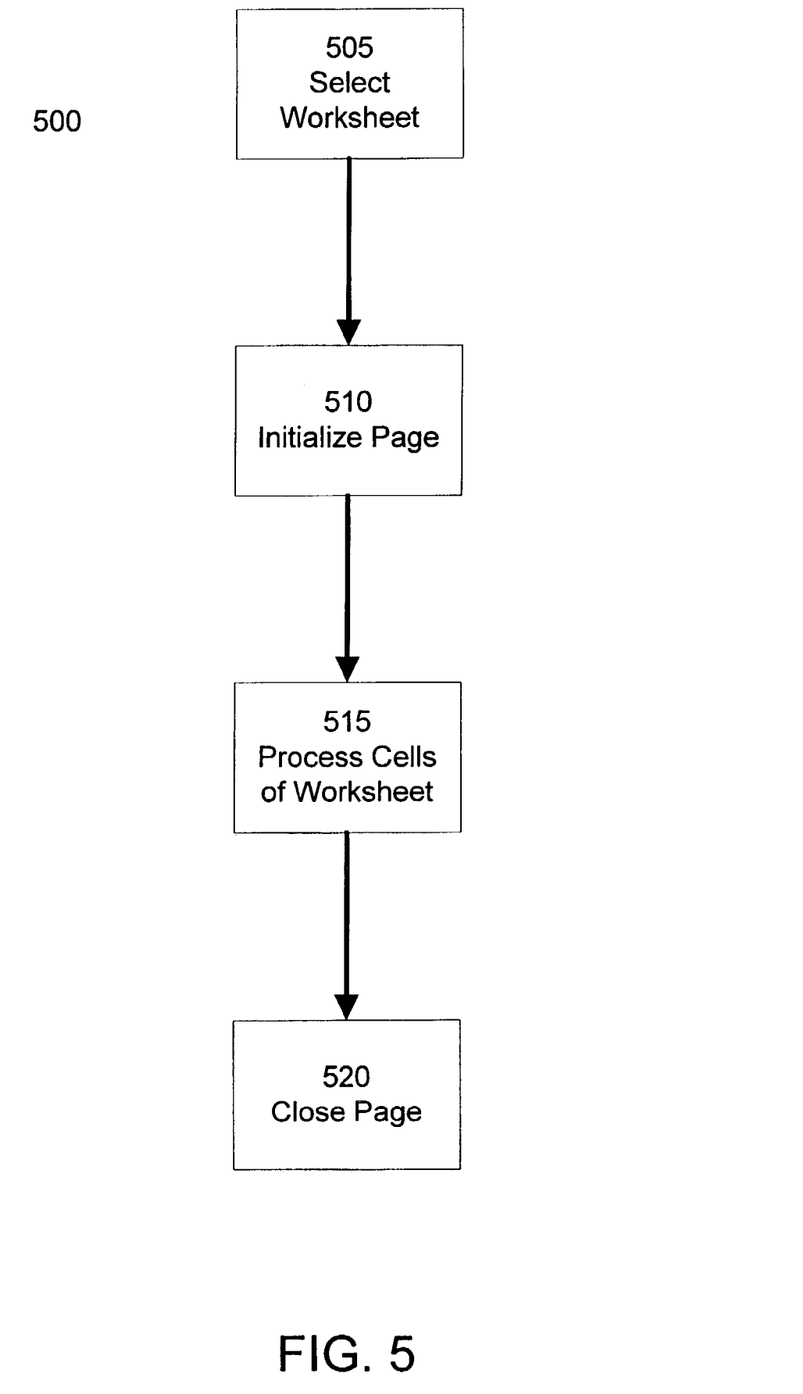
FIG. 5 illustrates a method of creating a web page display of a model according to an embodiment of the invention.

FIG. 5 illustrates a method 500 of creating a web page display of a model according to an embodiment of the invention. At step 505, the web application selects a worksheet for display as a web page. Step 505 includes selecting a worksheet from the calculator model, the cell value instances for the cells on the worksheet, and the corresponding set of cell objects associated with the cells on the worksheet. In an embodiment of the invention, worksheets in the calculator model are processed sequentially to provide a guided data entry process to model users. In a further embodiment, a model designer can use a rendering definition language macro to designate that a worksheet is hidden and should not be displayed. In this embodiment, if a cell object corresponding to a hidden worksheet macro is among the cell objects associated with a worksheet, step 505 will skip the selected worksheet and select the next worksheet for display.

At step 510, the web application initializes the page for display. Step 510 creates an HTML format source file and includes HTML source code for any headers, title bars, menus, status information, navigation controls, and/or other page attributes, such as fonts, colors, and backgrounds.

Typically, the order of HTML elements in an HTML source file determines the relative display position of these elements. An embodiment of method 500 creates an HTML source file by generating the source code for HTML elements in the order they are to be displayed, thereby "drawing" the page in the HTML format source file. In this embodiment, step 510 creates HTML source code for the top portion of a page, above the portion of the page displaying the model.

At step 515, the web application processes the cells of the selected worksheet and creates HTML source code for displaying the cells on the web page given the cell values of a particular calculator instance. As discussed above, each cell on the worksheet is associated with a cell object and a cell value instance. The cell object includes a display method for creating HTML source code to display the cell, and the cell value instance includes the actual value of the cell. The web application invokes each cell object's display method together with its cell value instance to create HTML source code for displaying the cell. The HTML source code associated with each cell is then added to the HTML format source file, so that the cells are integrated into the final web page.

An embodiment of step 515 processes the cells of the selected worksheet in the order that they are to be displayed. For example, step 515 processes cells in rows from left to right, and processes rows of cells from top to bottom. For each cell, step 515 invokes the display method of the associated cell object and then integrates the resulting HTML source code into the HTML format source file. In a further embodiment, step 515 also creates additional HTML source code to more precisely define the position of cells on the page. For example, step 515 can create an HTML table that arranges the cells in regular rows and columns.

Following the completion of step 515 for all of the cells on the selected worksheet, at step 520 the web application closes the page. Step 520 adds HTML source code to the HTML format source file to complete the web page. Step 520 can optionally add footers, menus, status information, navigation controls, and/or other additional user interface controls to the page. In an embodiment, step 520 adds HTML source code for any HTML elements positioned on the portion of the page located below the cells of the worksheet. Step 520 then communicates the completed HTML format source file to the model user's web browser for display.

Figure 6:
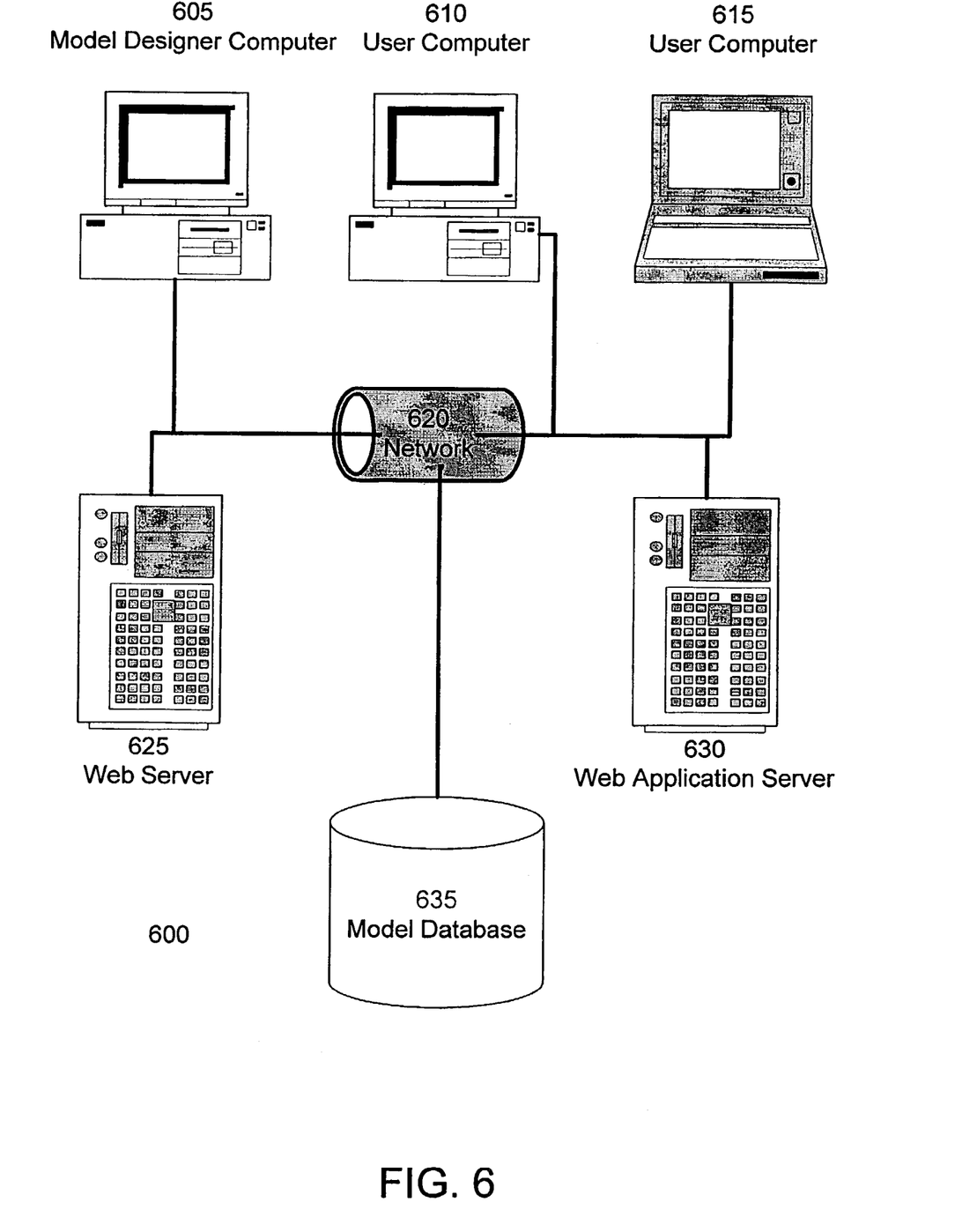
FIG. 6 illustrates a system for implementing the web application according to an embodiment of the invention.

FIG. 6 illustrates a system 600 for implementing the web application according to an embodiment of the invention. In this embodiment, system 600 includes a model designer computer 605. Model designer computer 605 can be a general purpose personal computer having a spreadsheet application, for example Microsoft Excel™, for creating a spreadsheet model. Model designer computer 605 can also include other software applications, such as web browsers, word processors, and/or web page design application, used to create the spreadsheet model and any associated templates.

System 600 also includes user computers 610 and 615. User computers 610 and 615 can be general purpose personal computers having web browser applications. Alternatively, user computers 610 and 615 can be any other electronic device, such as a thin-client computer, Internet-enabled mobile telephone, or personal digital assistant, capable of displaying and navigating web pages or other types of electronic documents. Although system 600 is shown with two user computers, any number of user computers can be supported.

A web server 625 is used to process requests for web pages or other electronic documents from user computers 610 and 615. In an embodiment of the invention, all model user interaction with the web application is via web pages sent to user computers via the web server 625. In a further embodiment, the model designer computer 605 transfers the completed spreadsheet model to the web application generator via a web page provided by the web server 625.

Web application server 630 operates the web application. In an embodiment, the web application server 630 is a general purpose computer capable of executing programs or scripts in response to the user computers 610 and 615, as well as model designer computer 605. The web application can be implemented as one or more scripts or programs written in any programming language, such as Java™, C, or C++, or any scripting language, such as Perl, Python, or TCL.

In an embodiment, the web application server 630 dynamically creates web pages for collecting input data and displaying output data. The web pages created by the web application server 630 are forwarded to the user computers via web server 625. Similarly, web server 625 receives web page requests and input data from the user computers 610 and 615, and forwards the web page requests and input data to web application server 630.

As the web application on web application server 630 processes model data and user computer requests, model data can be stored or retrieved from model database 635. Model database 635 stores the model and its associated data objects, such as calculator objects, and the set of cell objects. Model database 635 also stores model data values associated with each model instance of the web application and reports created by the model application. In an embodiment, the web application on the web application server 630 can retrieve any previously stored data, including models, model data, and reports from the model database 635 at any time. This allows model users to modify or update model data, and further permits managers and model designers to analyze model data.

An electronic communication network 620 enables communication between computers 605, 610, and 615, web server 625, web application server 630, and model database 635. In an embodiment, network 620 may further include any form of electrical or optical communication devices, including wireless and wired networks. Network 620 may also incorporate one or more local-area networks, such as an Ethernet network; wide-area networks, such as the Internet; and virtual networks, such as a virtual private network.

The system 600 is one example of executing a software application for visualizing visitor usage information according to an embodiment of the invention. In another embodiment, web application server 630, web server 625, and optionally model database 635 can be combined into a single server computer system. In alternate embodiment, all or a portion of the web application functions may be integrated into an application running on the model designer computer or the user computer. For example, the web application generator can be integrated into a spreadsheet application on the model designer computer. In another example, a Java™ or JavaScript™ application on the user computer is used to compute model data or display portions of the web application.

Although the invention has been discussed with respect to specific embodiments thereof, these embodiments are merely illustrative, and not restrictive, of the invention. For example, although the invention is discussed with reference to financial models and ROI assessments, the invention can be used to implement a web application from any use of a spreadsheet application.

In a further embodiment of the invention, additional or alternate display methods can be associated with each cell object type for communicating model values to and from the user. For example, a display method for a model output cell object can be adapted to communicate model values through voice or text. Similarly, a display method for a model input cell object can be adapted to receive model data values through voice recognition or text input.

It should also be noted that the present invention is not limited to creating electronic documents in either HTML or RTF formats. In yet a further embodiment, the display methods associated with the cell objects can be interfaced with XML documents, XForms documents, or other formats of electronic documents. Thus, the scope of the invention is to be determined solely by the claims.

What is claimed is:

1. A computer-implemented system implementing a model as a web application, comprising:
   a computer network,
   a model database coupled to the computer network, the model database storing:
      a computational data set defining a relationship between a set of model values;
      a rendering data set defining the appearance of at least a portion of the set of model values in the web application, the rendering data set including a set of objects, each object being associated with one of the model values of the set of model values and each object of the set including a rendering definition language macro that includes HTML source code that is configured to create at least one user interface element to display its associated model value, each object further including a method for at least one of inputting, outputting and calculating a value of an instance of the model value, and
      an instance data set including the set of model values of an instance of the web application;
   a computer coupled to the computer network and to the model database, the computer including:
      a calculation engine configured to create at least one model value in the instance data set from at least a portion of the set of the model values; and
      a layout engine configured to create display information from the computational data set, the rendering data set, and the instance data set, the display information including the HTML source code configured to enable the created at least one user interface element and the associated model value to be displayed within at least one web page.

2. The system of claim 1, wherein the computer further includes a persistence engine configured to store in the model database, to retrieve from the model database, and to modify at least one of the computational data set, the rendering data set, and the instance data set.

3. The system of claim 1, wherein each object of the set is of an object type corresponding to a model value type of its associated model value.

4. The system of claim 3, wherein at least one object type is associated with a model input value.

5. The system of claim 4, wherein at least one object type is further associated with a user interface element.

6. The system of claim 3, wherein at least one object type is associated with a model output value.

7. The system of claim 1, wherein each rendering definition language macro is configured to create the at least one user interface element for the associated model value in accordance with the object type of the object.

8. The system of claim 7, wherein the at least one user interface element is configured to receive the associated model value from a user.

9. The system of claim 7, wherein the at least one user interface element is configured to communicate the associated model value with a user.

10. The system of claim 7, wherein the display method creates the HTML source code to display the associated model value within a web page.

11. The system of claim 7, wherein the rendering definition language macro is configured to create a voice output to communicate the associated model value with a user.

12. The system of claim 1, further comprising:

a web application generator coupled to the model database and to the computer network and configured to create the computational data set, rendering data set, and instance data set from a model.

13. The system of claim 12, wherein the model includes a spreadsheet model.

14. The system of claim 13, wherein the spreadsheet model is organized into a plurality of worksheets; and the layout manager is configured to create display information from a portion of the rendering data set associated with one of the plurality of worksheets.

15. The system of claim 14, wherein the spreadsheet model is organized into a sequence of worksheets.

16. The system of claim 13, wherein the model includes a template.

17. The system of claim 13, wherein the spreadsheet model includes a spreadsheet cell associated with a model value and having a layout tag defining the appearance of the model value in the web application.

18. The system of claim 17, wherein the layout tag is associated with an object type; and further wherein the web application generator is configured to create an object of the object type in response to the layout tag.

19. The system of claim 1, wherein the at least one user interface element is a RTF-format electronic document.

* * * * *

UNITED STATES PATENT AND TRADEMARK OFFICE
CERTIFICATE OF CORRECTION

PATENT NO. : 7,523,395 B1 Page 1 of 1
APPLICATION NO. : 10/452699
DATED : April 21, 2009
INVENTOR(S) : Aman Naimat et al.

It is certified that error appears in the above-identified patent and that said Letters Patent is hereby corrected as shown below:

On Title page, in Item (75), in "Inventors", in column 1, line 3, delete "Namait" and insert -- Naimat --, therefor.

Signed and Sealed this

First Day of June, 2010

David J. Kappos
*Director of the United States Patent and Trademark Office*